United States Patent
Fan et al.

(10) Patent No.: US 10,713,424 B2
(45) Date of Patent: Jul. 14, 2020

(54) AUTOMATED DOCUMENT CONTENT MODIFICATION

(71) Applicant: Microsoft Technology Licensing, LLC, Redmond, WA (US)

(72) Inventors: Zhouying Fan, Redmond, WA (US); Yichen Wang, Bellevue, WA (US); Dario Pavlovic, Bellevue, WA (US); Theresa A. Estrada, Redmond, WA (US); Sumit Gulwani, Sammamish, WA (US); Jeffrey Weston, Seattle, WA (US); Daniel Adam Perelman, Seattle, WA (US); Itai Rosenberger, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/949,707

(22) Filed: Apr. 10, 2018

(65) Prior Publication Data
US 2019/0311022 A1    Oct. 10, 2019

(51) Int. Cl.
*G06F 17/00*     (2019.01)
*G06F 40/166*    (2020.01)

(52) U.S. Cl.
CPC .................. *G06F 40/166* (2020.01)

(58) Field of Classification Search
CPC .... G06F 17/24; G06F 17/2785; G06F 40/166; G06K 9/00442
See application file for complete search history.

(56) References Cited

U.S. PATENT DOCUMENTS

| | | | | |
|---|---|---|---|---|
| 7,788,291 | B2* | 8/2010 | Levow | G06F 16/9574 707/803 |
| 9,286,526 | B1* | 3/2016 | Manohar | G06K 9/033 |
| 9,383,911 | B2* | 7/2016 | Aymeloglu | G06F 17/2288 |
| 9,959,296 | B1* | 5/2018 | Gubin | G06F 16/219 |
| 10,169,301 | B1* | 1/2019 | Zeevi | G06F 3/04883 |
| 2004/0080532 | A1* | 4/2004 | Cragun | G06F 16/34 715/745 |
| 2006/0173959 | A1* | 8/2006 | McKelvie | H04L 51/04 709/204 |
| 2007/0112819 | A1* | 5/2007 | Dettinger | G06F 17/241 |
| 2008/0270915 | A1* | 10/2008 | Tevanian | G06F 16/958 715/751 |

(Continued)

FOREIGN PATENT DOCUMENTS

WO     2017113110 A1     7/2017

OTHER PUBLICATIONS

"International Search Report and Written Opinion Issued in PCT Application No. PCT/US19/024719", dated Jun. 25, 2019,10 Pages.

*Primary Examiner* — Laurie A Ries
(74) *Attorney, Agent, or Firm* — Schwegman Lundberg & Woessner, P.A.

(57) ABSTRACT

Systems and methods may be used to present changes to a document on a user interface. A method may include receiving, on the user interface, a user input including an edit task to a first portion of a document. The method may include determining, using a processor, that a second portion of the document includes text changeable by the edit task. The method may include automatically performing the edit task on the second portion of the document within the user interface based on the determination.

20 Claims, 14 Drawing Sheets

(56) References Cited

U.S. PATENT DOCUMENTS

| | | | | |
|---|---|---|---|---|
| 2008/0295013 | A1* | 11/2008 | Evans | G06F 17/24 |
| | | | | 715/770 |
| 2009/0076792 | A1* | 3/2009 | Lawson-Tancred | |
| | | | | G06F 17/212 |
| | | | | 704/2 |
| 2014/0149857 | A1* | 5/2014 | Vagell | G06F 17/241 |
| | | | | 715/255 |
| 2014/0281873 | A1* | 9/2014 | Frew | G06F 17/2288 |
| | | | | 715/229 |
| 2014/0281880 | A1* | 9/2014 | Sachs | G06F 17/218 |
| | | | | 715/234 |
| 2015/0019541 | A1* | 1/2015 | Carus | G06F 16/93 |
| | | | | 707/723 |
| 2015/0046801 | A1* | 2/2015 | Liu | G06F 17/24 |
| | | | | 715/255 |
| 2017/0116179 | A1* | 4/2017 | Gagne-Langevin | G06F 17/24 |
| 2017/0200122 | A1* | 7/2017 | Edson | G06Q 10/101 |
| 2018/0217725 | A1* | 8/2018 | Wygonik | G06F 1/1616 |
| 2018/0239959 | A1* | 8/2018 | Bui | G06F 3/0484 |
| 2019/0065456 | A1* | 2/2019 | Platow | G06F 17/243 |
| 2019/0155882 | A1* | 5/2019 | Jain | G06F 17/24 |

\* cited by examiner

File  Home  Insert  Draw  Design  Layout  References  Mailings  Review  View  Developer Proofing | Accessibility | Language | Comments | Tracking | Changes | Compare

1. OVERVIEW

INFORMATION

2. CONTACTS

1. JOHN SMITH 123-45-XXXX
   2. JAKE CRAIG 234-56-XXXX
   3. RHONDA O'NEIL 345-67-XXXX
   4. MEGAN MCGEE 456-78-XXXX
   5. JAMES MADISON 567-89-XXXX
   6. ELLIE WASHINGTON 678-90-XXXX
   7. JAMIE WOODS 789-01-XXXX

3. IMPLEMENTATION

Page 1 Of 2    934 Words    English    +80%

200

FIG. 2A example.docx

File  Home  Insert  Draw  Design  Layout  References  Mailings  Review  View  Developer Proofing | Accessibility | Language | Comments | Tracking | Changes | Compare

1. OVERVIEW

INFORMATION

2. CONTACTS
    1. JOHN SMITH 123-45-XXXX
    2. JAKE CRAIG 234-56-XXXX
    3. RHONDA O'NEIL 345-67-XXXX
    4. MEGAN MCGEE 456-78-XXXX
    5. JAMES MADISON 567-89-XXXX
    6. ELLIE WASHINGTON 678-90-XXXX
    7. JAMIE WOODS 789-01-XXXX

3. IMPLEMENTATION

Page 1 Of 2    934 Words    English    +80%

*FIG. 2B*

File  Home  Insert  Draw  Design  Layout  References  Mailings  Review  View  Developer example.docx Proofing | Accessibility | Language | Comments | Tracking | Changes | Compare

1. OVERVIEW

INFORMATION

2. CONTACTS

1. JOHN SMITH 123-45-XXXX
 2. JAKE CRAIG 234-56-XXXX
 3. RHONDA O'NEIL 345-67-XXXX
 4. MEGAN MCGEE 456-78-XXXX
 5. JAMES MADISON 567-89-XXXX
 6. ELLIE WASHINGTON 678-90-XXXX
 7. JAMIE WOODS 789-01-XXXX

3. IMPLEMENTATION

Page 1 Of 2 934 Words English +80%

*FIG. 2C*

| EXAMPLES | BEFORE | AFTER |
|---|---|---|
| REDACTION | 123-45-6789<br>987-65-4321 | 123-45-XXXX<br>987-65-XXXX |
| REPLACING CONTENT | THE NUMBER OF USERS CLICKING A<br>THE NUMBER OF USERS CLICKING B<br>THE NUMBER OF USERS CLICKING C<br>THE NUMBER OF USERS CLICKING D | THE % OF USERS CLICKING A<br>THE %OF USERS CLICKING B<br>THE %OF USERS CLICKING C<br>THE %OF USERS CLICKING D |
| ABBREVIATION/<br>CONTENT<br>RESTRUCTURING | SATYA NADELLA, CHIEF EXECUTIVE OFFICER<br>AMY HOOD, CHIEF FINANCIAL OFFICER | CEO: SATYA NADELLA<br>CFO: AMY HOOD |
| ADDING NEW CONTENT | SATYA NADELLA, CHIEF EXECUTIVE OFFICER<br>AMY HOOD, CHIEF FINANCIAL OFFICER | SATYA NADELLA; TITLE: CEO<br>AMY HOOD; TITLE: CFO |
| RESUME:<br>STRUCTURE<br>CONSISTENCY | responsible for...<br>oversee...<br>supervise... | RESPONSIBLE FOR...<br>OVERSEE...<br>SUPERVISE... |
| DATE RE-FORMATTING | 2019-1-1<br>2019-6-6<br>2019-12-17 | 1/1/2019<br>6/6/2019<br>12/17/2019 |

*FIG. 3*

AUTOMATED DOCUMENT CONTENT MODIFICATION

BACKGROUND

There are many repetitive and time consuming tasks facing users attempting to format or change content in a text document today. Currently, a user has to make these changes manually. In order to automate some repetitive tasks, user may opt to create a macro or a small program to perform the tasks. However, creating a macro or program often requires programing skills or advanced computer knowledge or skills, which puts these solutions out of reach of many users. Some spreadsheet techniques simply fill empty cells with new content based on existing patterns, but do not modify any existing content.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 2A-2C illustrate a user interface for presenting a document including automatic formatting modification in accordance with some embodiments.

FIG. 3 illustrates example text and formatting changes to a document in accordance with some embodiments.

DETAILED DESCRIPTION

Figure 1A:
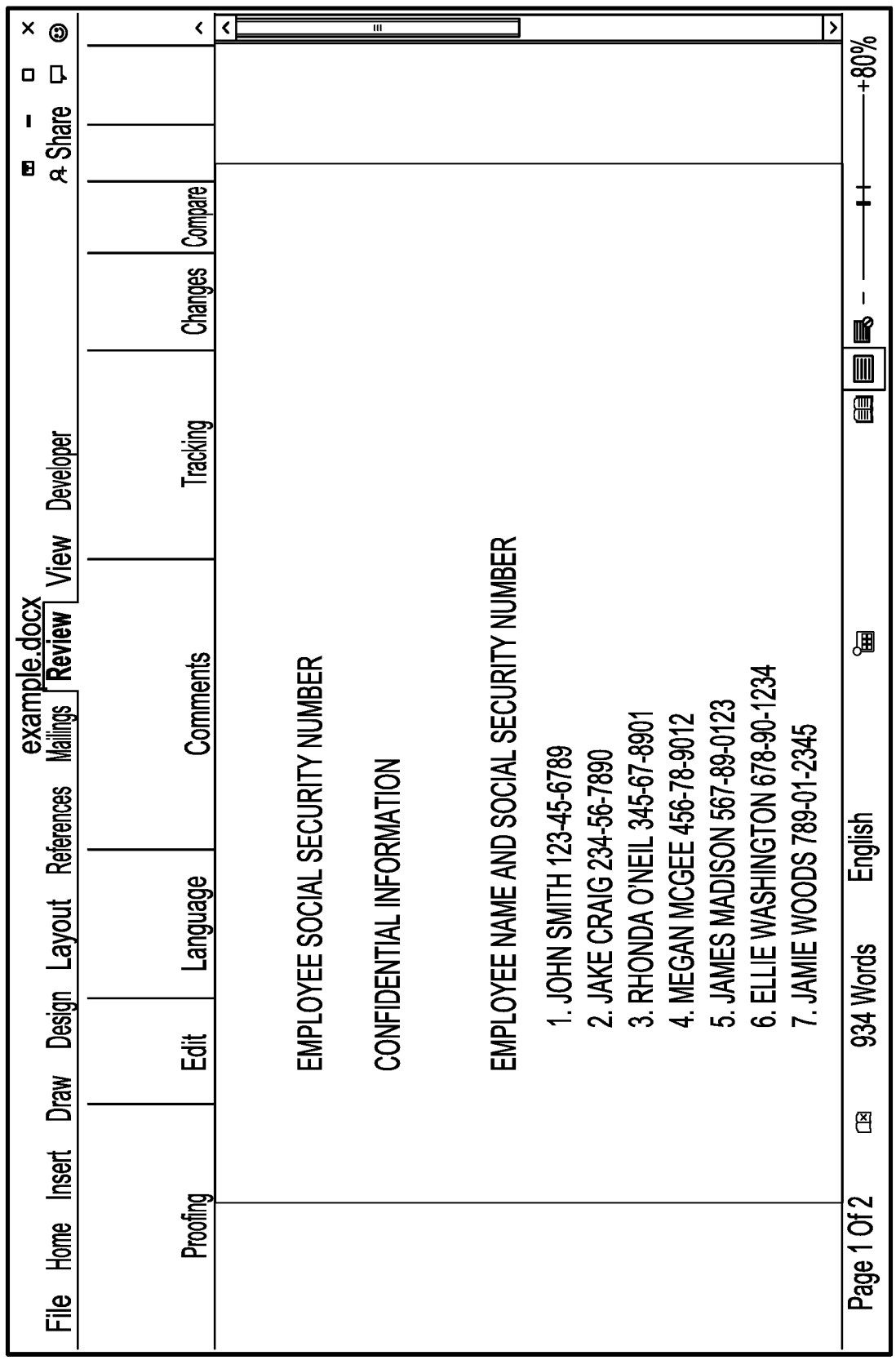
FIGS. 1A-1G illustrate a user interface for presenting a document including automatic text modification in accordance with some embodiments.

Systems and methods for performing automatic edits in a text document are described herein. The systems and methods described herein may be used to apply edits to a portion of a document in response to an initial user edit. Repetitive tasks may be automated to improve experience in a user interface. The automation may speed up document processing and present unique and specific edits on a user interface. Some common repetitive tasks may include applying a specific direct formatting to all headings repetitively, redacting a series of numbers to retain confidentiality, modifying a list of entries in similar way such as capitalizing a first letter, adding a period to an end of a sentence, etc.

The systems and methods described herein allow for automated edits with, for example, a single user example. Based on the single example, the systems and methods may determine a user's intention, extrapolate to other potential edits throughout a document, and modify the document based on a pattern identified from the determined intention. In an example, a system may determine the pattern based on an additional action performed by a user, such as a cursor placement (e.g., at a determined second item in a list), starting a second edit, completing a second example, or the like.

In an example, a system may intelligently recognize a pattern in a document and apply changes across existing and new content. A system may leverage artificial intelligence technology, machine learning technology (e.g., trained or untrained), or the like. For example, the system may use a software development kit (SDK) or other framework of technologies for programming by examples. This may include automatic generation of programs from input-output examples at runtime to determine user intent, other applicable text that edits may be applied to within a document, or a pattern of text. For example, given a domain-specific language and some input-output examples for the desired program's behavior, the SDK may be used to synthesize a ranked set of domain-specific language programs that are consistent with the examples. In an example, a threshold may be used. For example, the system may use a threshold based on a confidence score to determine whether to apply the automatic edits (or to ask the user whether the user wants the edits applied).

In an example, a pattern may be recognized based on a document or documents other than a current document. For example, previous documents edited or drafted by a user may be used to determine or identify a pattern within a current document. In another example, style, formatting, or content changes in documents by other users may be considered and used to determine or identify a pattern in a current document. These examples may be combined or used with or instead of recognizing a pattern within a current document.

The systems and methods described herein allow a user to benefit from the automatic edits without needing to understand any programming concepts such as macros or regular expressions. In an example, the user does not need to activate the automatic edits, or identify that repetitive tasks are being done. Rather, the systems and methods may automatically detect that the user is conducting a repeatable task. After identification of the repeatable task, the systems and methods may be used to scan the document to identify whether there are other places to apply the same edit. When identified, the systems and methods may automatically surface suggestions to modify the document or perform the edits automatically.

The edits performed automatically based on a user example may include string modification (e.g., changing text, such as redacting numbers or letters, changing spelled out words to abbreviations, etc.), or formatting modifications (e.g., capitalizing letters, font changes, such as underline, italicize, bolding, size, etc.). Some automatic edits may include both format changes and string changes (e.g., redacting and changing font type).

Once one, or optionally two, examples are performed (or some action between one and two examples, such as when an example edit includes a deletion and an addition of text, the action in between may include the deletion without the addition), the system determines a pattern, and identifies similar structures that could use a similar pattern to update the other structures. For example, a method may include receiving a user edit of an entry inside a list, identifying that the user has moved a cursor to another entry inside the same list, and triggering the automatic edits. Optionally, the user may be notified that automatic edits are available. In this example, when the user selects the result, content gets updated and highlighted, and when the user closes a portion of a user interface (or selects to not receive the automatic edits), the portion of the user interface may not launch again until the user edits another list.

Figure 1B:
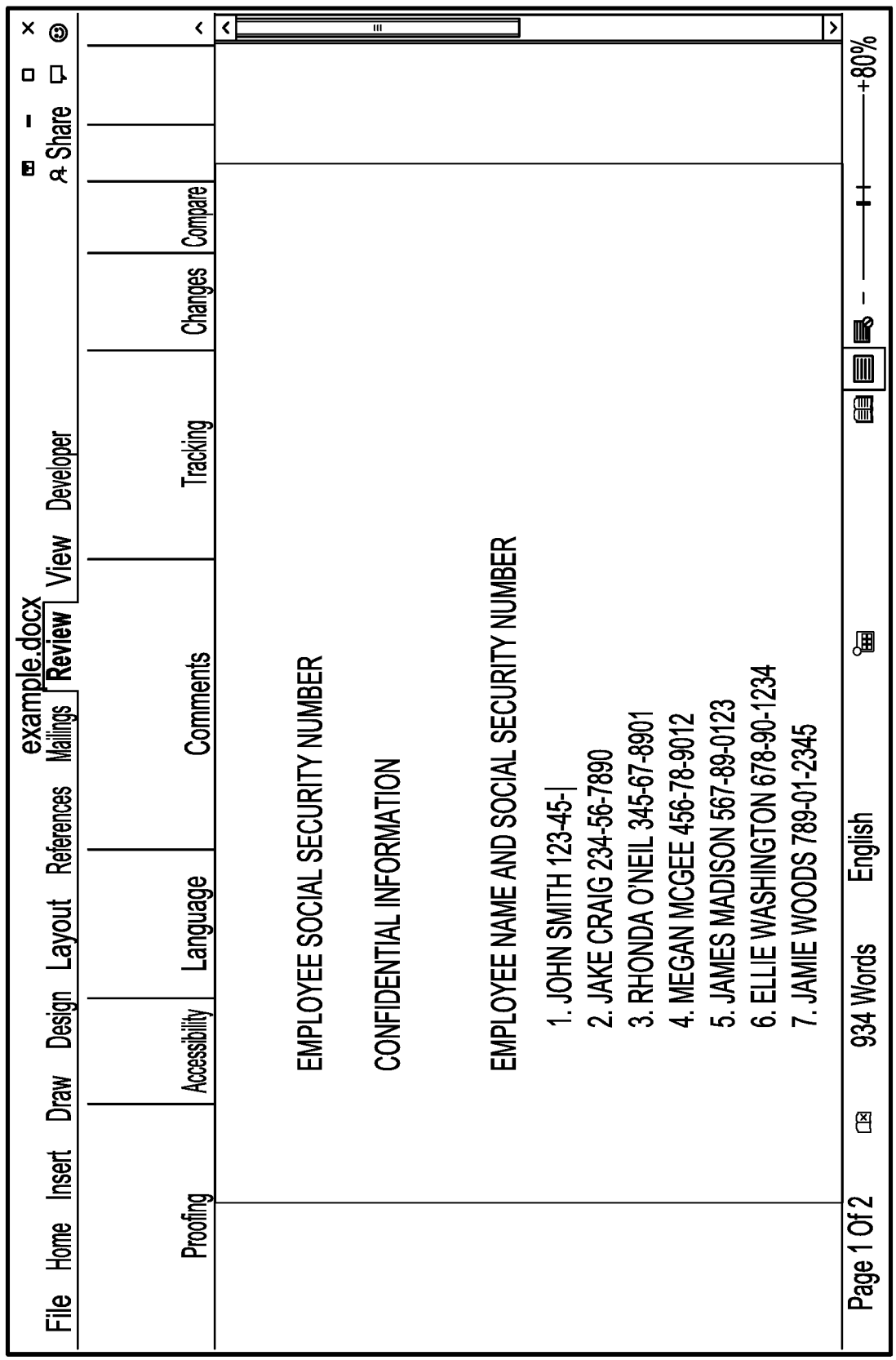

FIGS. 1A-1G illustrate a user interface 100 for presenting a document including automatic text modification in accordance with some embodiments. The document displayed on user interface 100 is modified in each of the FIGS. 1A-1G, and the modifications may be user modifications or automatic modifications. The document depicts a set of names with social security numbers. In FIG. 1A, the numbers are un-redacted. FIG. 1B illustrates an intermediate edit, where the user has deleted the last four digits of John Smith's number, but has not yet added placeholder text. FIG. 1B's intermediate edit may represent a type of edit that does not exceed a confidence score/threshold for applying automatic edits (e.g., the edit is not complete).

Figure 1C:
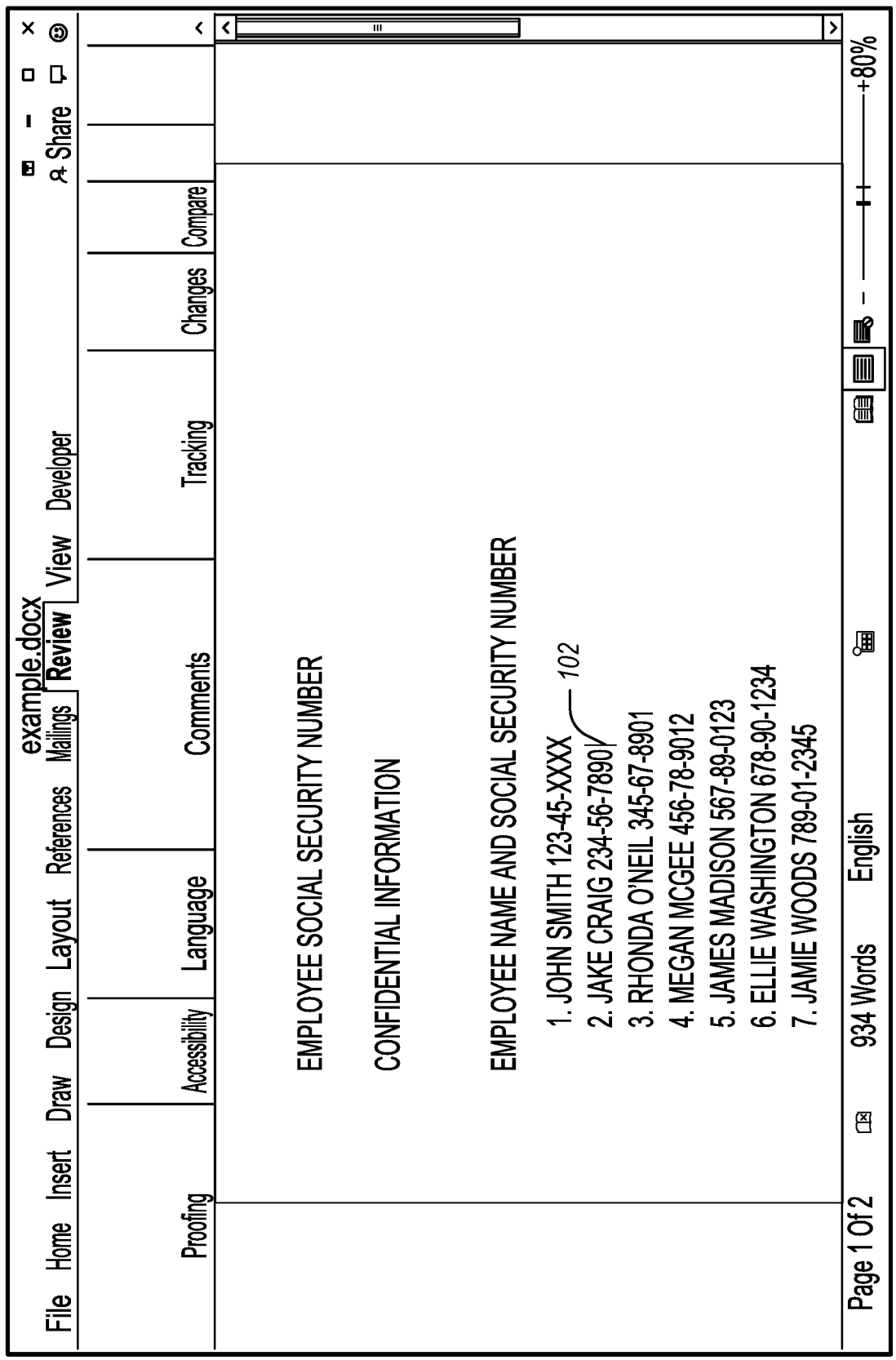

FIG. 1C illustrates a completed edit, where "XXXX" has replaced the last four digits of John Smith's number. In an example, FIG. 1C also illustrates a cursor placement 102, which is displayed next to Jake Craig's social security number. In an example, upon completion of the edit (e.g., by adding "XXXX"), an automatic edit identification may be triggered. For example, after completion of the edit, a notification may be presented on the user interface 100 to the user to indicate that additional edits may be made to the document automatically (e.g., to change the last four digits of each number to "XXXX"). In another example, the additional edits may be applied automatically without notification to the user, but which the user may select to undo if desired.

In an example, after the edit is completed, an additional action by the user may be required before triggering automatic edits. For example placement of the cursor 102 at the location shown in FIG. 1C may trigger the automatic edits. A system may identify, from the cursor 102 placement that the user is attempting to perform a second edit (on Jake Craig's number) corresponding to the completed edit. Other actions of this sort may trigger the automatic edits, such as a keystroke (e.g., a press of a spacebar), entry of text or deletion of text (e.g., when XXXX is entered before the numbers are deleted), highlighting text (e.g., with the cursor, highlighting the numbers to delete/change to XXXX), or the like. In another example, a user may perform two edits, which may be recognized as a pattern.

Figure 1D:
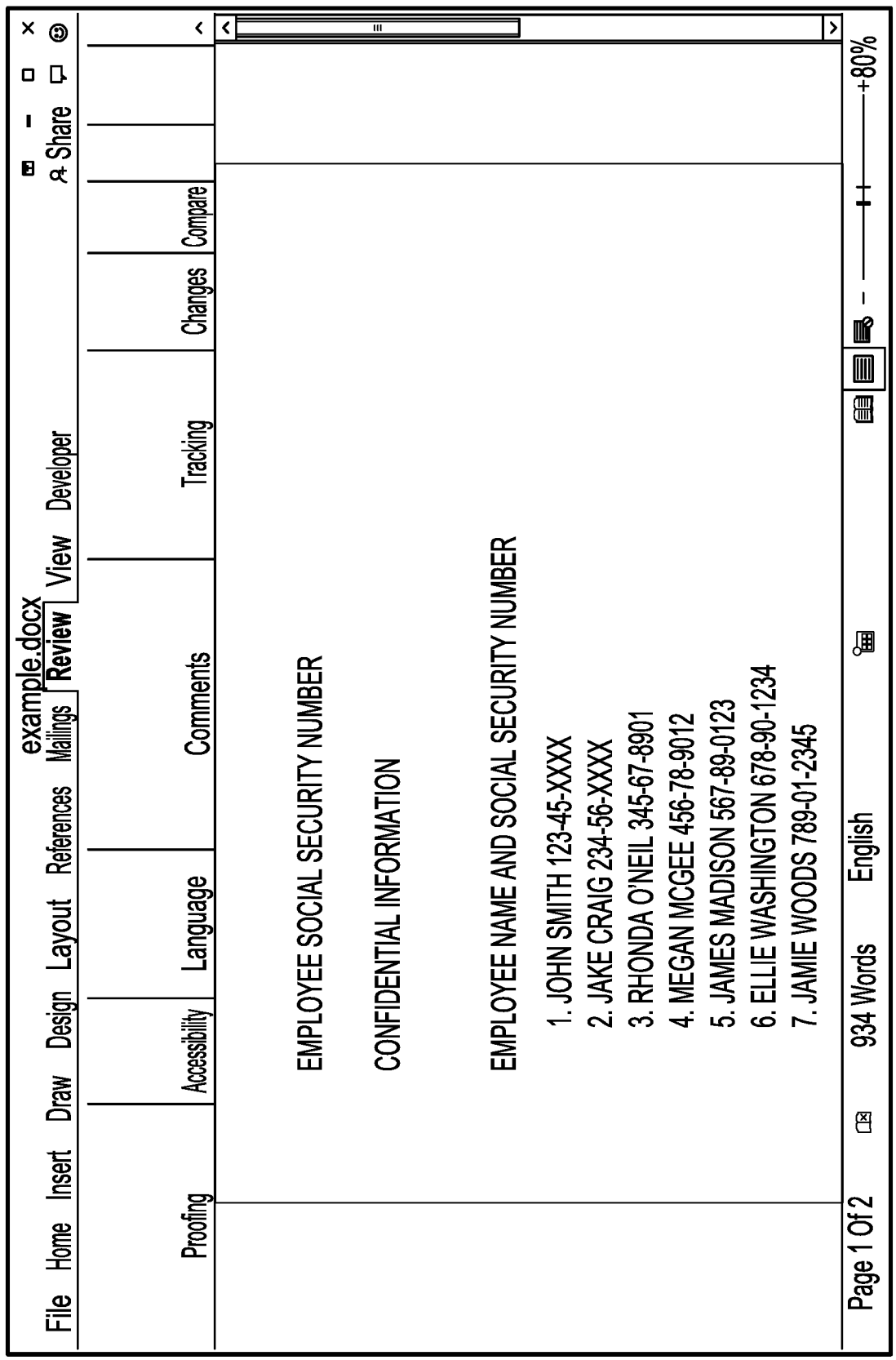

FIG. 1D illustrates a second edit performed on the document (for Jake Craig's number). In an example, the second edit may be automatically performed by the system, after which the user may choose to keep the automatic edit or undo the automatic edit. When the user chooses to keep the automatic edit, additional edits may be made (e.g., to numbers for Rhonda, Megan, James, Ellie, and Jamie).

Figure 1E:
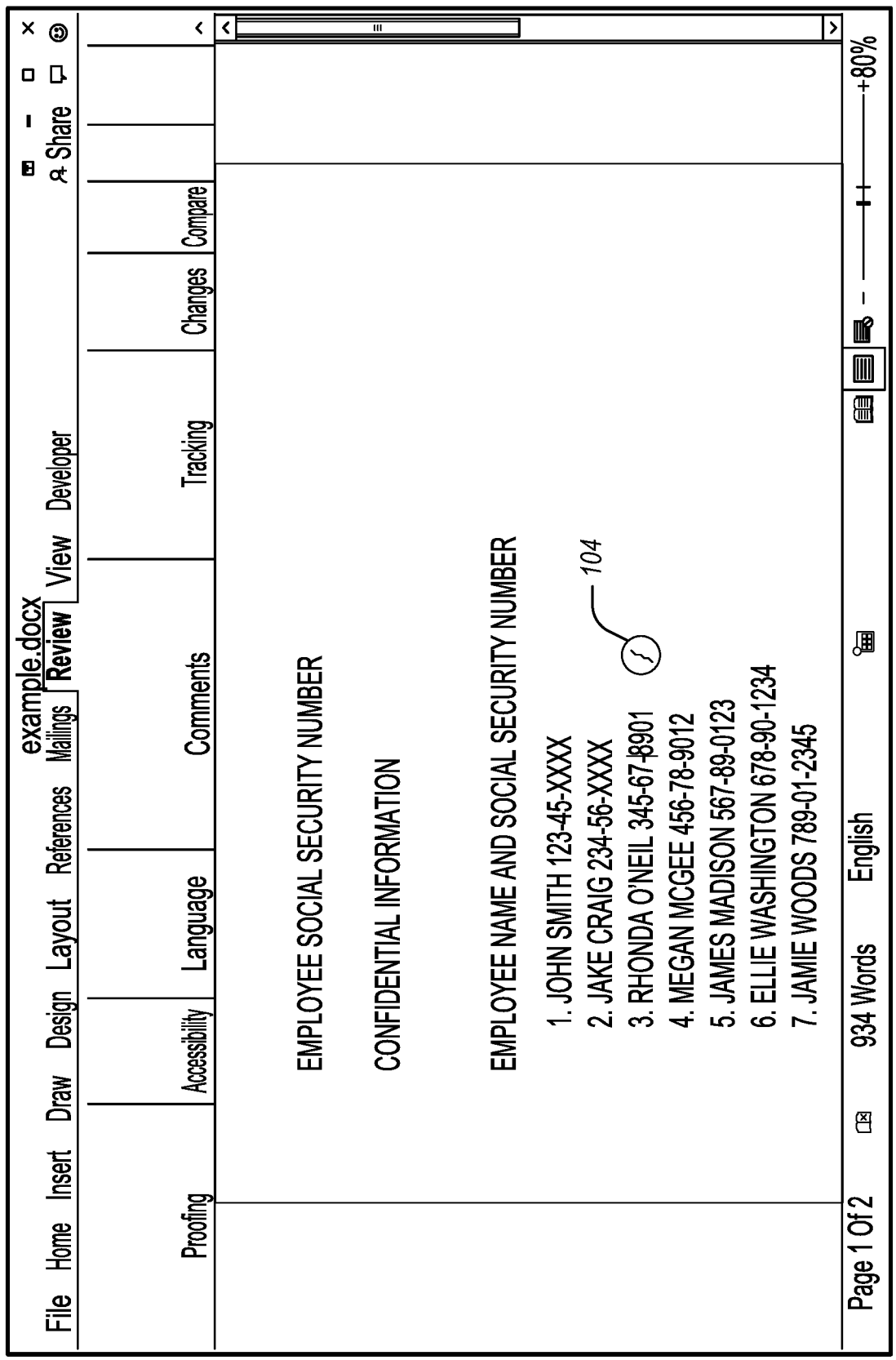
Figure 1F:
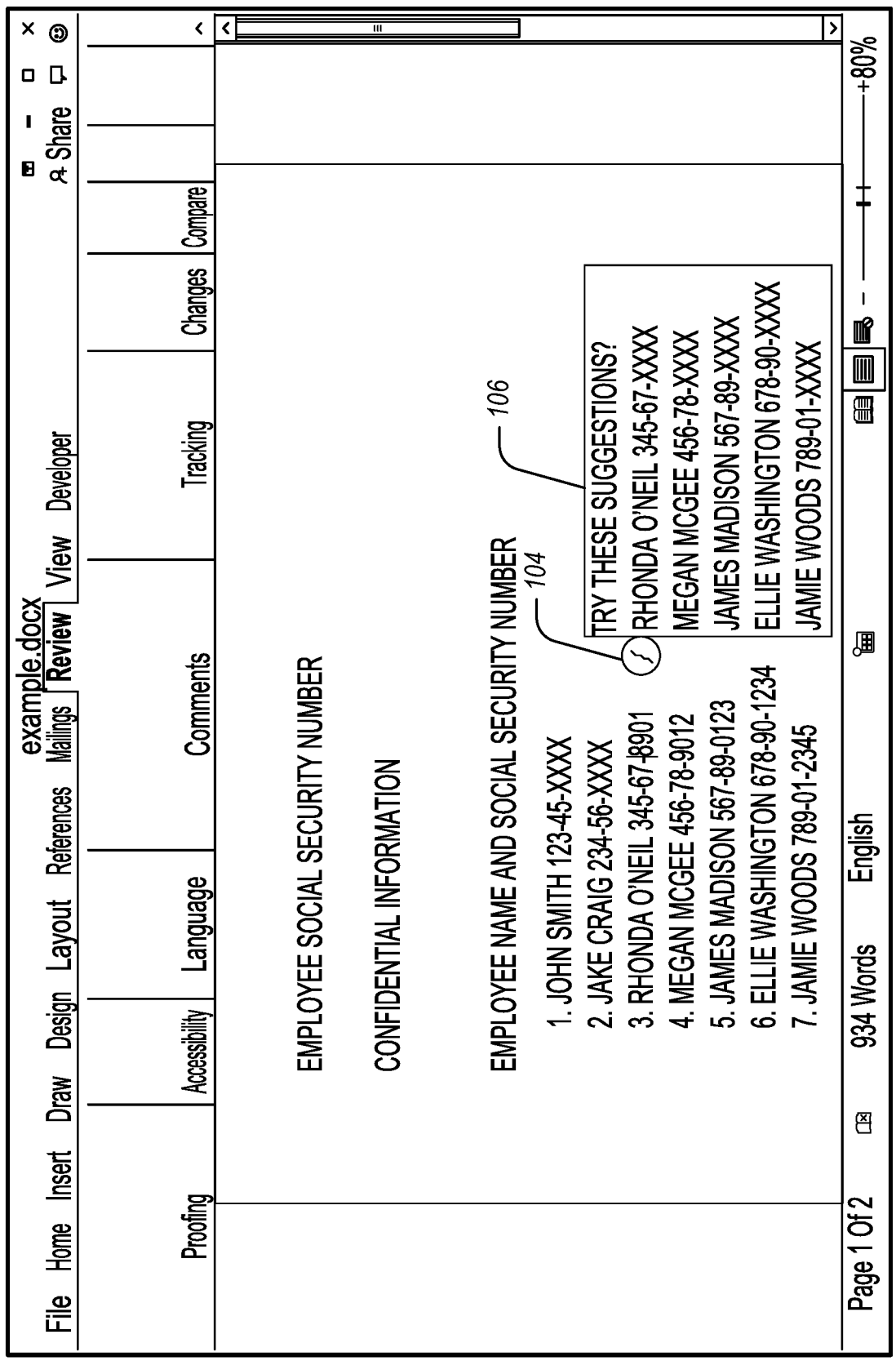
Figure 1G:
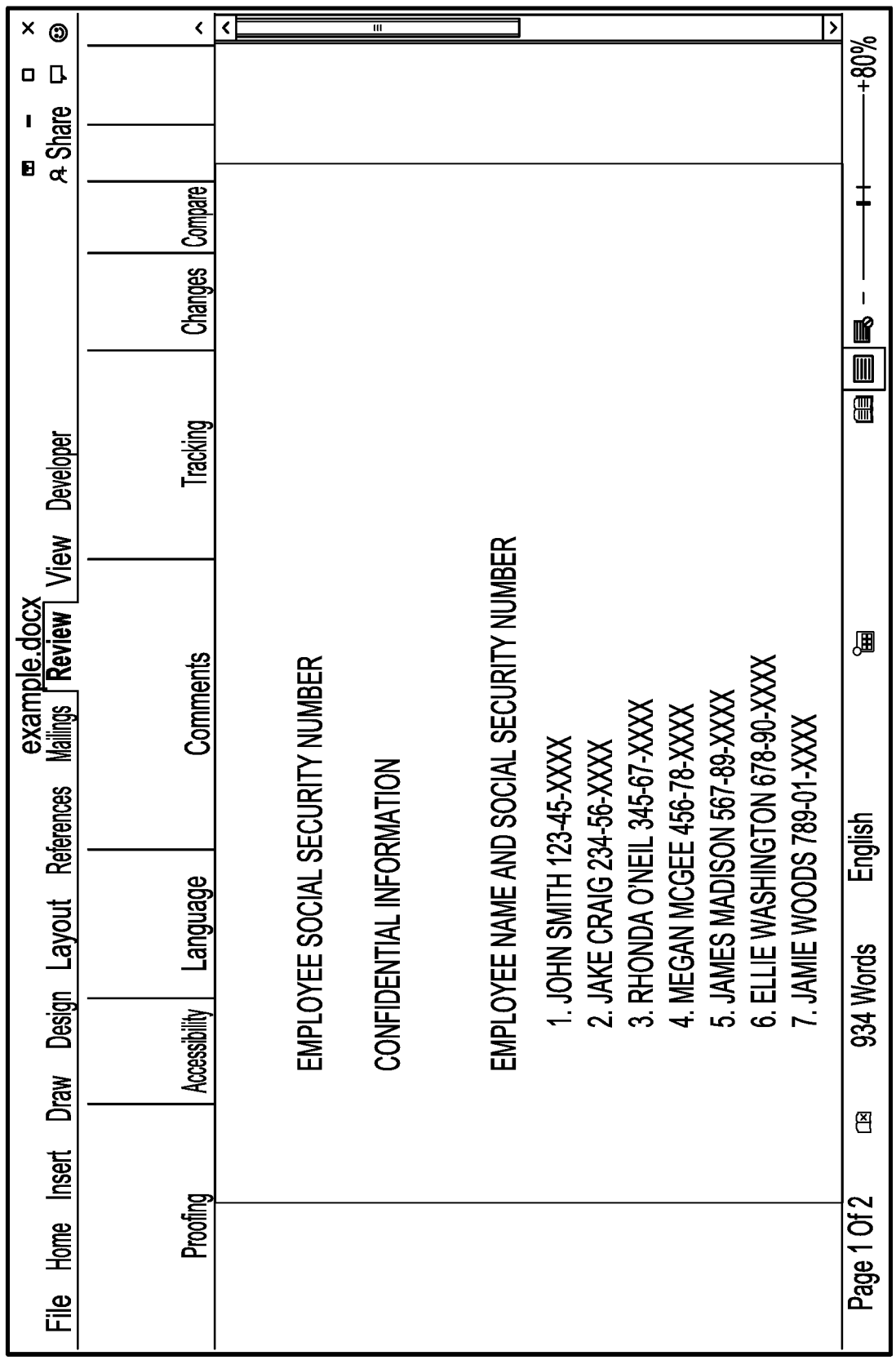

In another example, the second edit of FIG. 1D may be performed by the user. In response, the system may detect a pattern and apply additional edits or suggest additional edits as described below. FIGS. 1E-1G show, for convenience, the example where the user has entered a second edit, which triggers additional automatic actions. However, any of the above triggers may be used with the user interface described for FIGS. 1E-1G. For example, cursor placement, keystroke, text entry, deletion, highlighting, etc., may be used instead of or in addition to the second edit to trigger actions depicted in FIGS. 1E-1G.

FIG. 1E illustrates a user interface component 104 that is used to alert the user that additional edits are available for automatic performance. The user interface component 104 may be selected by the user (e.g., using a pointer), which may cause the user interface to transition the document to the state shown in FIG. 1F. In FIG. 1F, the user interface component 104 has expanded to include suggested automatic edits 106. In an example, the user interface component 104 or the suggested automatic edits 106 may include a selectable component (not shown) for the user to select, which upon selection causes the suggested automatic edits 106 to be applied to the document. In an example, the user may select somewhere in the document other than the user interface component 104 or the suggested automatic edits 106 to close both. In an example, the user interface component 104 or the suggested automatic edits 106 may include a selectable button to close these components and decline the automatic edits. In an example, the automatic edits may be selected and applied to the document based on other user input, such as hitting a button (e.g., enter or spacebar).

After the automatic edits are applied, the document appears in the user interface according to the example shown in FIG. 1G. All automatic edits have been applied to the remaining similarly formatted text of numbers. FIG. 1G may result from any of the examples described above, such as directly from any of the document states shown in FIGS. 1C-1F. In an example, the user interface 100 may include, in the document shown in FIG. 1G, an option to the user to undo the automatic edits.

FIGS. 2A-2C illustrate a user interface 200 for presenting a document including automatic formatting modification in accordance with some embodiments. Similar to the automatic textual/string edits described above in relation to FIGS. 1A-1G, automatic formatting changes are shown in FIGS. 2A-2C, and described below.

FIG. 2A includes a document shown on the user interface 200 before any formatting edits have been applied. FIG. 2B shows a formatting edit, where the text "1. OVERVIEW" has been edited to be bolded, italicized, and underlined. FIG. 2C shows remaining similar text ("2. CONTACTS" and "3. IMPLEMENTATION") automatically reformatted according to the formatting changes applied to the "1. OVERVIEW" text. In an example, the automatic formatting changes may be triggered according to any of the techniques described above for the string edits. For example, based solely on the first example, and identification of other similar text or user actions including: cursor placement, a second example, a portion of a second example, or the like.

FIG. 3 illustrates example text and formatting changes to a document in accordance with some embodiments. The example text changes and formatting changes in FIG. 3 are illustrative, and not limiting. The examples shown in FIG. 3 may be determined and edited automatically. For example, a state of a list may be captured, such as when a user first navigates (e.g., places a cursor) at or within the list. The list may be captured again after the user edits the list (e.g., edits a first example). The list may be captured when the user performs an additional action, such as a second edit example, placing a cursor at a location to begin the second edit example (but before the second edit example is actually performed), or performing a portion of the second edit. These captures may be sent to a machine learning component to learn examples. Training data for these examples may be marked (e.g., this is an edit that should be made, this is a list, etc.). In an example, when the first capture and a subsequent capture are different, the captures may be used in the machine learning component for training. The two captures that differ may be testing data (e.g., not labeled) and used in the machine learning component for unsupervised training.

Example formatting changes may include: formatting headings based on a first example; capitalizing names;

redacting certain types of content (names, SSN, etc.); positioning pictures based on examples, wrapping, size, etc.; table layout clean up, such as fixing column widths across tables; proofing, such as automating changes in spelling of a word, applied everywhere else automatically; forms creation, such as turning all similar types of data in to fields automatically; template document creation, such as changing a customer name throughout a document after a first user replacement; footnotes by example; creating a table of contents based on a first manually typed example; automatically creating cross-references based on what the user types (e.g., "see table on page 2"); reorganizing research content to move each portion of content that is highlighted a color to be near one another, or alternatively to move everything that's "green" to a new document; content editing, such as replacing two spaces after period with one or putting a quotation mark around a name/number; changing a date format; formatting a list; recovering a "paste" function, by learning what a next paste recovery for a next example is, based on a first example; or the like. In an example, formatting changes may include object positioning or modification changes. For example, setting a wrapping style of an object (e.g., an image, a text box, etc.), alignment, cropping an image, inserting or modifying a shape, a 3D model, or the like.

In an example, a list may be modified, for example such that: each list entry has the same styling; the document remembers the list style in the future after a user formats the list in certain way; or the like. In an example, a heading may be modified, for example such that: there are consistent styling for all headings at the same level; the document automatically recognizes sentence as headings, and format the heading as the user types; or the like. In an example, a table may be modified, for example such that: tables fit properly on a page; all tables in the same document have consistent styling; all rows in the table to have roughly the same height; all tables in the same document have the same column width; the document automatically recognizes and formats column/row headers; tables extracted from PDF/Images are fixed; or the like.

Example find and replace changes may include: extrapolation in tables; extrapolation in lists; consistent list structure (e.g., Capitalize, add period at the end); redact content such as SSN in a list; extrapolation for "date" entity; apply the change to all words/phrases representing the same entity when the user changes one of these words/phrases; content in table cell gets formatted automatically based on column/row names; for example: all numbers with "revenue" in column name are formatted as "currency"; recognize fillable blanks in a document, and automatically populate suggestions based on previous blanks the user filled in other documents (e.g. form filling); or the like.

Example content extraction changes may include: generate a table of contents when the user types (or copy): for example, a heading+" . . . "+page number; recognize sentences for headings, suggest a table of contents at the beginning of document, and update as the user adds more content; extract content from PDFs/Images/Webpages; bibliography detection/clean up; or the like.

Figure 4:
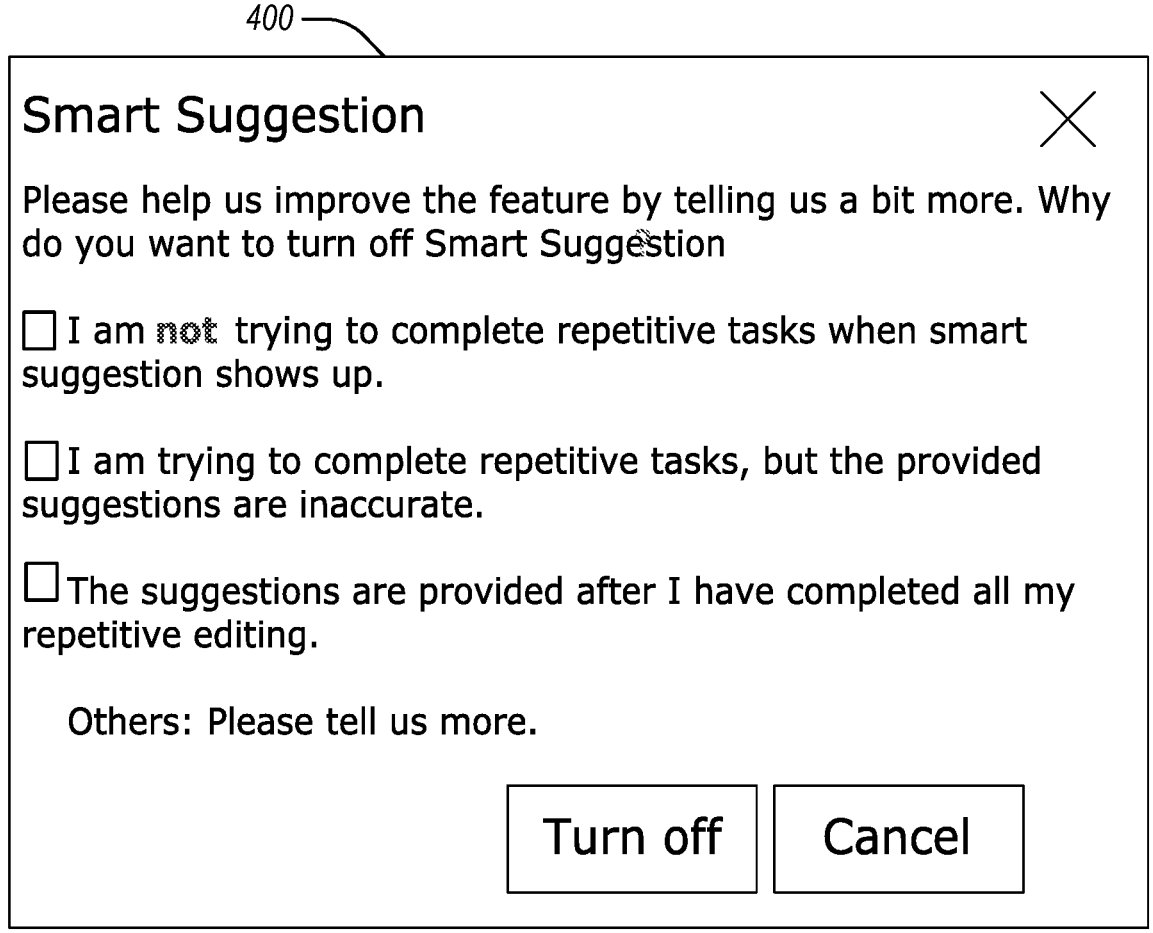
FIG. 4 illustrates an interactive user interface component for controlling automatic changes to a document in accordance with some embodiments.

FIG. 4 illustrates an interactive user interface component 400 for controlling automatic changes to a document in accordance with some embodiments. The interactive user interface component 400 may be used to turn off automatic edits. For example, when a user does not want the automatic edits or they are not being applied in a way the user desires, the automatic edits may be turned off using the interactive user interface component 400.

In an example, the user may navigate through individual suggestions to accept or decline, or one-click to apply all (accept or decline). The user may modify a suggestion or automatic edit. For example, the user may provide a second example to improve suggestions for the same content block. In an example, the system may apply learnings to other content block in the same document. In an example, the system may apply learnings to other documents.

The interactive user interface component 400 includes potential reasons for turning off automatic edits. In an example, a given reason may cause automatic edits to be turned off solely for a particular content block (e.g., a section, a document, etc.), a type of edit, only that particular automatic edit, or the like. In another example, a given reason may cause automatic edits to be turned off for an entire document, or permanently for a particular user or machine (which may be turned back on at the user's discretion). Example given reasons include automatic edits being applied when not needed, inaccurate automatic edits, or suggestions after all desired edits are already applied. An option may be provided in the interactive user interface component 400 for additional feedback from the user.

Automatic edits may also be turned off automatically without use of the interactive user interface component 400. For example, when a user performs an undo command once, automatic edits may be turned off for suggestions in a same list, document, table, etc. In another example, when a user deletes an automatic edit (e.g., manually undoes the edit without performing an undo command), the automatic edits may be turned off. In an example, when a user undoes X % (e.g., 50%, 75%, etc.) of the automatic edits (or manually reverts that percentage), the system may prompt the user to turn automatic edits off, or may turn the automatic edits off without user input (but which may include alerting the user). In another example, when a user ignores the automatic edit prompt some specified number of times (e.g., 5) consecutively or in total, the system may prompt the user to turn automatic edits off, or may turn the automatic edits off without user input (but which may again include alerting the user).

Figure 5:
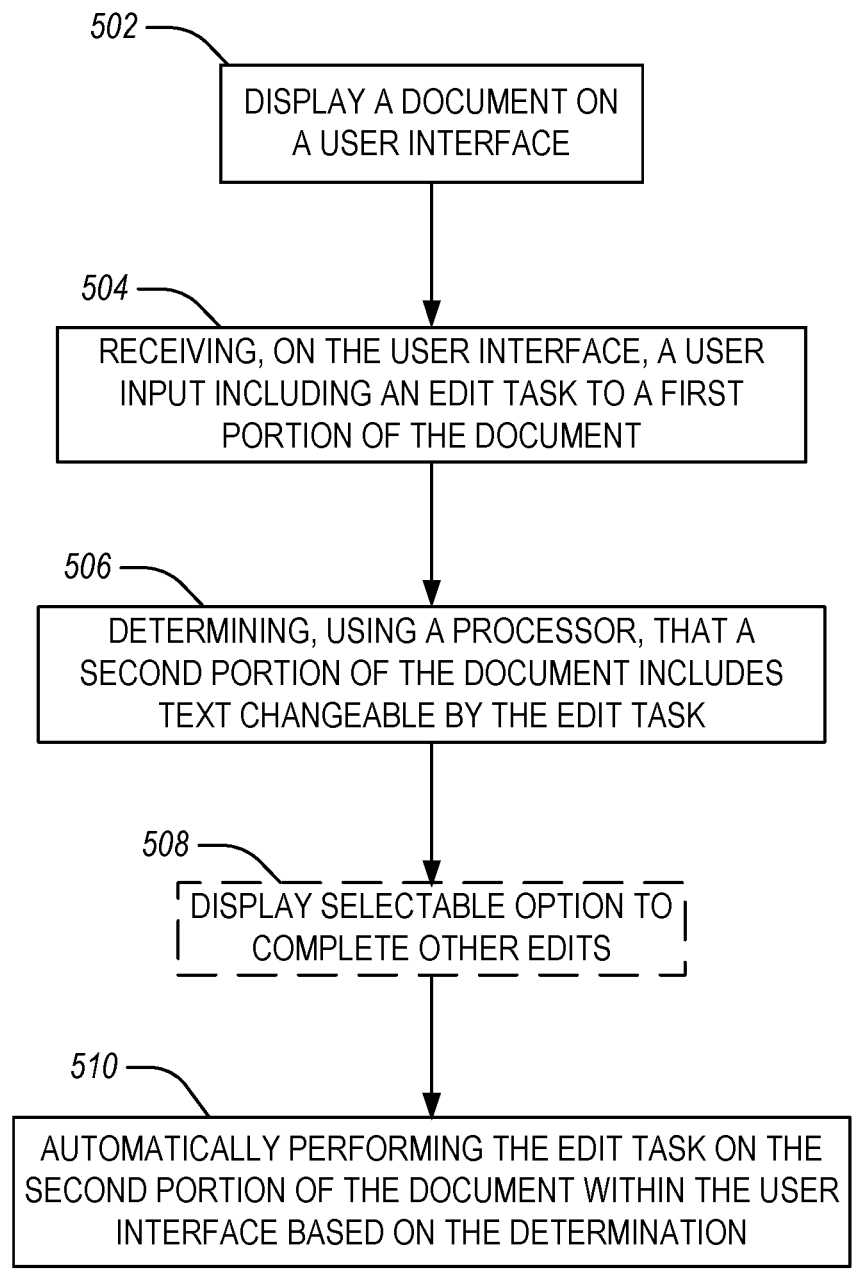
FIG. 5 illustrates a flowchart showing a technique for modifying a document in accordance with some embodiments.

FIG. 5 illustrates a flowchart showing a technique 500 for modifying a document in accordance with some embodiments. The technique 500 includes an operation 502 to display the document on a user interface, such as a text document, a document editing webpage or website, or the like. The user interface may be displayed on a display screen of a computer or connected to a computer, a mobile device (e.g., a phone or tablet), or the like. The technique 500 includes an operation 504 to receive, on the user interface, a user input including an edit task to a first portion of the document. The edit task may include a format change, a content change, or both.

The technique 500 includes an operation 506 to determine, using a processor, that a second portion of the document includes text changeable by the edit task. In an example operation 506 may be triggered by a user interaction, such as a cursor placement (e.g., in a location to perform the edit task on the second portion of the document), second edit, cursor placement after second edit, portion of second edit performed, etc. The technique 500 includes an optional operation 508 to display a selectable option to complete other edits.

The technique 500 includes an operation 510 to automatically perform the edit task on the second portion of the document within the user interface based on the determination. In an example, the technique 500 may include an optional operation to display or highlight the second portion of the document within the user interface to indicate the second portion of the document includes the text changeable by the edit task. This optional operation may be performed before automatically performing the edit task on the second portion of the document.

Operation 510 may include automatically performing the edit task on the second portion of the document without identification of the second portion of the document by a user. In an example, the technique may include presenting a selectable user interface component within the user interface, the selectable user interface component including an option to automate the edit task on the second portion of the document, based on the determination. Operation 510 may include automatically performing the edit task in response to receiving, on the selectable user interface component, a user selection of the option to automate the edit task on the second portion of the document.

Figure 6:
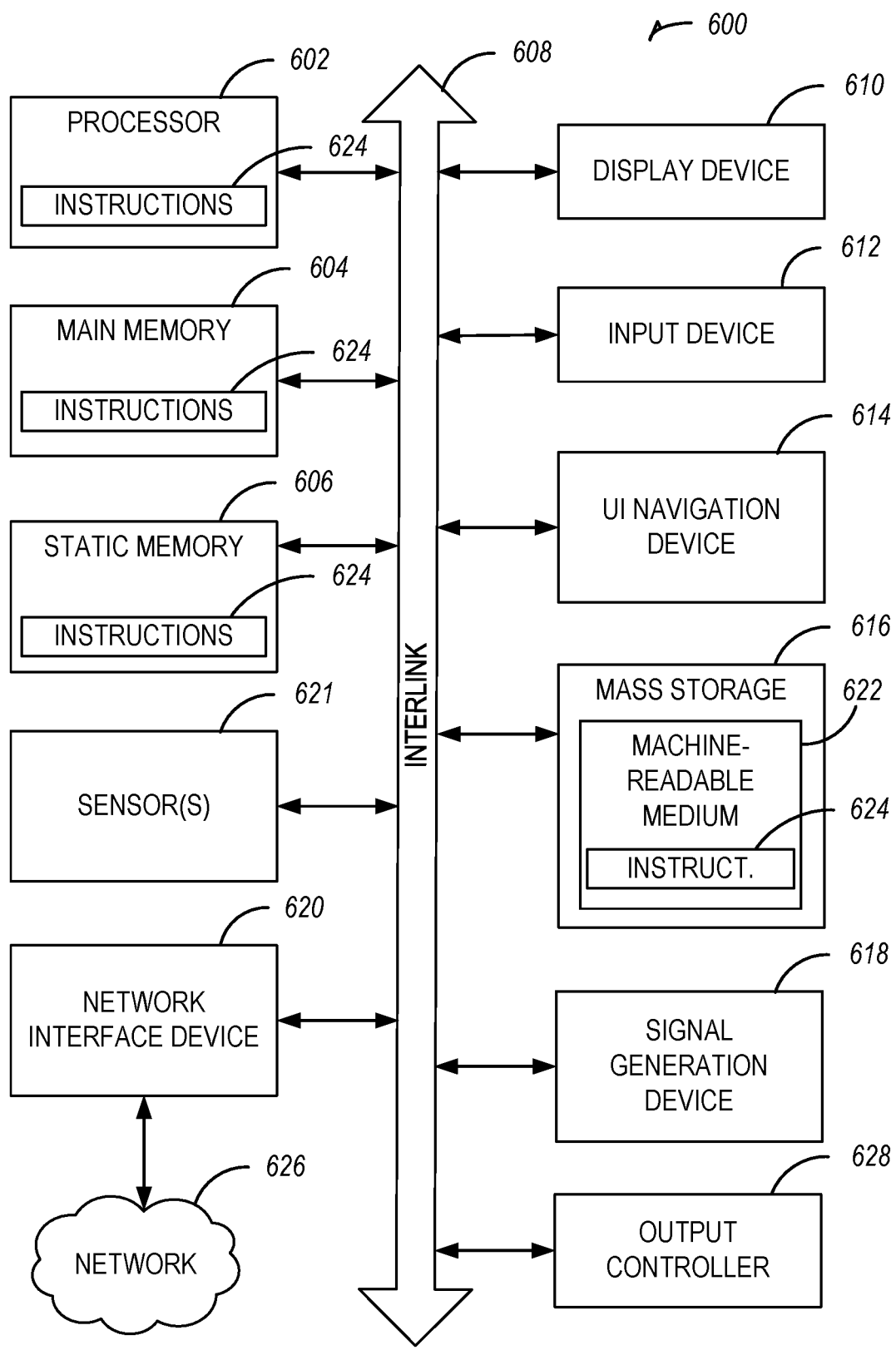
FIG. 6 illustrates generally an example of a block diagram of a machine upon which any one or more of the techniques discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Each of the non-limiting examples below may stand on its own, or may be combined in various permutations or combinations with one or more of the other examples.

Example 1 is a method comprising: receiving, on a user interface, a user input including an edit task to a first portion of a document, the edit task including a change to text in the first portion of the document; determining, using a processor, that a second portion of the document includes, text changeable by the edit task by matching a pattern of text in the second portion of the document to the text in the first portion of the document, the text in the second portion of the document differing from the text in the first portion of the document; and automatically performing the edit task on the second portion of the document within the user interface based on the determination.

In Example 2, the subject matter of Example 1 includes, based on the determination, presenting a selectable user interface component within the user interface, the selectable user interface component including an option to automate the edit task on the second portion of the document; and wherein automatically performing the edit task includes automatically performing the edit task in response to receiving, on the selectable user interface component, a user selection of the option to automate the edit task on the second portion of the document.

In Example 3, the subject matter of Examples 1-2 includes, wherein the edit task includes a format change or a string change to the text in the first portion of the document.

In Example 4, the subject matter of Examples 1-3 includes, wherein determining that the second portion of the document includes text changeable by the edit task includes receiving a second user input.

In Example 5, the subject matter of Example 4 includes, wherein the second user input is a cursor placement in a location to perform the edit task on the second portion of the document without the user performing the edit task.

In Example 6, the subject matter of Examples 4-5 includes, wherein the second user input includes performing the edit task on a third portion of the document.

In Example 7, the subject matter of Examples 1-6 includes, wherein automatically performing the edit task on the second portion of the document includes automatically performing the edit task on the second portion of the document without identification of the second portion of the document by a user.

In Example 8, the subject matter of Examples 1-7 includes, wherein the document is presented in a document editing webpage.

In Example 9, the subject matter of Examples 1-8 includes, before automatically performing the edit task on the second portion of the document, displaying and highlighting the second portion of the document within the user interface to indicate the second portion of the document includes the text changeable by the edit task.

Example 10 is a machine-readable medium including instructions for presenting a user interface, which when executed by a processor, cause the processor to: receive, on the user interface, a user input including an edit task to a first portion of a document, the edit task including a format change to text in the first portion of the document; determine, using a processor, that a second portion of the document includes, text changeable by the edit task by matching a pattern of text in the second portion of the document to the text in the first portion of the document, the text in the second portion of the document differing from the text in the first portion of the document; and automatically perform the edit task on the second portion of the document within the user interface based on the determination.

In Example 11, the subject matter of Example 10 includes, wherein the instructions are further to, based on the determination, present a selectable user interface component within the user interface, the selectable user interface component including an option to automate the edit task on the second portion of the document, and wherein to automatically perform the edit task, the instructions further cause the processor to automatically perform the edit task in response to receiving, on the selectable user interface component, a user selection of the option to automate the edit task on the second portion of the document.

In Example 12, the subject matter of Examples 10-11 includes, wherein the edit task includes a format change or a string change to the text in the first portion of the document.

In Example 13, the subject matter of Examples 10-12 includes, wherein to determine that the second portion of the document includes text changeable by the edit task, the instructions further cause the processor to receive a second user input.

In Example 14, the subject matter of Example 13 includes, wherein the second user input is a cursor placement in a location to perform the edit task on the second portion of the document without the user performing the edit task.

In Example 15, the subject matter of Examples 10-14 includes, wherein to automatically perform the edit task, the instructions further cause the processor to automatically perform the edit task on the second portion of the document without identification of the second portion of the document by a user.

In Example 16, the subject matter of Examples 10-15 includes, wherein the instructions further cause the processor to, before automatically performing the edit task on the second portion of the document, display and highlight the second portion of the document within the user interface to indicate the second portion of the document includes the text changeable by the edit task.

Example 17 is a system comprising: a display to present a user interface; processing circuitry to: receive, via the user interface, a user input including an edit task to a first portion of a document, the edit task including a format change to text in the first portion of the document; determine that a second portion of the document includes, text changeable by the edit task by matching a pattern of text in the second portion of the document to the text in the first portion of the document, the text in the second portion of the document differing from the text in the first portion of the document; automatically update the second portion of the document with the edit task based on the determination; and output the updated second portion of the document to the display for presenting on the user interface.

In Example 18, the subject matter of Example 17 includes, wherein the processing circuitry is further to, based on the determination, present a selectable user interface component within the user interface, the selectable user interface component including an option to automate the edit task on the second portion of the document, and wherein to automatically update the second portion of the document, the processing circuitry is further to automatically update the second portion of the document in response to receiving, on the selectable user interface component, a user selection of the option to automate the edit task on the second portion of the document.

In Example 19, the subject matter of Examples 17-18 includes, wherein the edit task includes a format change or a string change to the text in the first portion of the document.

In Example 20, the subject matter of Examples 17-19 includes, wherein to determine that the second portion of the document includes text changeable by the edit task, the processing circuitry is further to receive a second user input of a cursor placement in a location to perform the edit task on the second portion of the document without the user performing the edit task.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
   receiving, on a user interface, a user input including an edit task to a first portion of a document, the edit task including a change to text in the first portion of the document;
   determining, using a processor, that a second portion of the document includes text changeable by the edit task by matching a pattern of text in the second portion of the document to the text in the first portion of the document, the text in the second portion of the document differing from the text in the first portion of the document, wherein the pattern of text for the second portion of the document is identified from the first portion of the document based on historical data; and
   automatically performing the edit task on the second portion of the document within the user interface based on the determination.

2. The method of claim 1, further comprising:
   based on the determination, presenting a selectable user interface component within the user interface, the selectable user interface component including an option to automate the edit task on the second portion of the document; and
   wherein automatically performing the edit task includes automatically performing the edit task in response to receiving, on the selectable user interface component, a user selection of the option to automate the edit task on the second portion of the document.

3. The method of claim 1, wherein the edit task includes a format change or a string change to the text in in the first portion of the document.

4. The method of claim 1, wherein determining that the second portion of the document includes text changeable by the edit task includes receiving a second user input.

5. The method of claim 4, wherein the second user input is a cursor placement in a location to perform the edit task on the second portion of the document without the user performing the edit task.

6. The method of claim 4, wherein the second user input includes performing the edit task on a third portion of the document.

7. The method of claim 1, wherein automatically performing the edit task on the second portion of the document includes automatically performing the edit task on the second portion of the document without identification of the second portion of the document by a user.

8. The method of claim 1, wherein the document is presented in a document editing webpage.

9. The method of claim 1, further comprising before automatically performing the edit task on the second portion of the document, displaying and highlighting the second portion of the document within the user interface to indicate the second portion of the document includes the text changeable by the edit task.

10. A machine-readable medium including instructions for presenting a user interface, which when executed by a processor, cause the processor to:
    receive, on the user interface, a user input including an edit task to a first portion of a document, the edit task including a change to text in the first portion of the document;
    determine, using a processor, that a second portion of the document includes text changeable by the edit task by matching a pattern of text in the second portion of the document to the text in the first portion of the document, the text in the second portion of the document differing from the text in the first portion of the document, wherein the pattern of text for the second portion of the document is identified from the first portion of the document based on historical data; and
    automatically perform the edit task on the second portion of the document within the user interface based on the determination.

11. The machine-readable medium of claim 10, wherein the instructions are further to, based on the determination, present a selectable user interface component within the user interface, the selectable user interface component including an option to automate the edit task on the second portion of the document, and wherein to automatically perform the edit task, the instructions further cause the processor to automatically perform the edit task in response to receiving, on the selectable user interface component, a user selection of the option to automate the edit task on the second portion of the document.

12. The machine-readable medium of claim 10, wherein the edit task includes a format change or a string change to the text in in the first portion of the document.

13. The machine-readable medium of claim 10, wherein to determine that the second portion of the document includes text changeable by the edit task, the instructions further cause the processor to receive a second user input.

14. The machine-readable medium of claim 13, wherein the second user input is a cursor placement in a location to perform the edit task on the second portion of the document without the user performing the edit task.

15. The machine-readable medium of claim 10, wherein to automatically perform the edit task, the instructions further cause the processor to automatically perform the edit task on the second portion of the document without identification of the second portion of the document by a user.

16. The machine-readable medium of claim 10, wherein the instructions further cause the processor to, before automatically performing the edit task on the second portion of the document, display and highlight the second portion of the document within the user interface to indicate the second portion of the document includes the text changeable by the edit task.

17. A system comprising:
a display to present a user interface;
processing circuitry to:
receive, via the user interface, a user input including an edit task to a first portion of a document, the edit task including a change to text in the first portion of the document;
determine that a second portion of the document includes text changeable by the edit task by matching a pattern of text in the second portion of the document to the text in the first portion of the document, the text in the second portion of the document differing from the text in the first portion of the document, wherein the pattern of text for the second portion of the document is identified from the first portion of the document based on historical data;
automatically update the second portion of the document with the edit task based on the determination; and
output the updated second portion of the document to the display for presenting on the user interface.

18. The system of claim 17, wherein the processing circuitry is further to, based on the determination, present a selectable user interface component within the user interface, the selectable user interface component including an option to automate the edit task on the second portion of the document, and wherein to automatically update the second portion of the document, the processing circuitry is further to automatically update the second portion of the document in response to receiving, on the selectable user interface component, a user selection of the option to automate the edit task on the second portion of the document.

19. The system of claim 17, wherein the edit task includes a format change or a string change to the text in in the first portion of the document.

20. The system of claim 17, wherein to determine that the second portion of the document includes text changeable by the edit task, the processing circuitry is further to receive a second user input of a cursor placement in a location to perform the edit task on the second portion of the document without the user performing the edit task.

* * * * *